United States Patent [19]

Weimer

[11] 4,273,996

[45] Jun. 16, 1981

[54] SEQUENTIAL CARD READER SYSTEM

[75] Inventor: Dan G. Weimer, Scottsdale, Ariz.

[73] Assignee: Engineered Systems, Inc., Tempe, Ariz.

[21] Appl. No.: 51,988

[22] Filed: Jun. 25, 1979

[51] Int. Cl.$^3$ .......................... G06K 7/00; G06K 5/00

[52] U.S. Cl. .................................... 235/435; 235/436; 235/437

[58] Field of Search ............... 235/425, 434, 480, 431, 235/438; 340/149 A, 436, 437

[56] References Cited

U.S. PATENT DOCUMENTS

| | | | |
|---|---|---|---|
| 3,029,019 | 4/1962 | Dayger | 235/425 |
| 3,124,674 | 3/1964 | Edwards | 235/434 |
| 3,436,736 | 4/1969 | Platt | 235/473 |
| 3,860,793 | 1/1975 | Roe | 235/425 |
| 4,004,136 | 1/1977 | Torok | 235/480 |

*Primary Examiner*—Daryl W. Cook
*Attorney, Agent, or Firm*—LaValle D. Ptak

[57] ABSTRACT

A card reader having a limited capacity for use with digitally encoded cards is used in conjunction with a system requiring a greater amount of information than is encoded on a single card. A multiple stage buffer storage memory is placed between the card reader and the utilization system. The memory has specific memory locations corresponding to locator data which is uniquely encoded on each of the different cards of a set of cards employed to supply the necessary information to the utilization system. A data locator is connected between the card reader and the buffer storage means and is responsive to locator data read from the cards by the reader to direct the information data on the cards to the proper location in the buffer storage memory. The cards may be inserted into the reader in any order; and when all of the areas of the buffer storage memory have the necessary data encoded in them, the information is transferred from the buffer storage memory to the utilization system.

4 Claims, 1 Drawing Figure

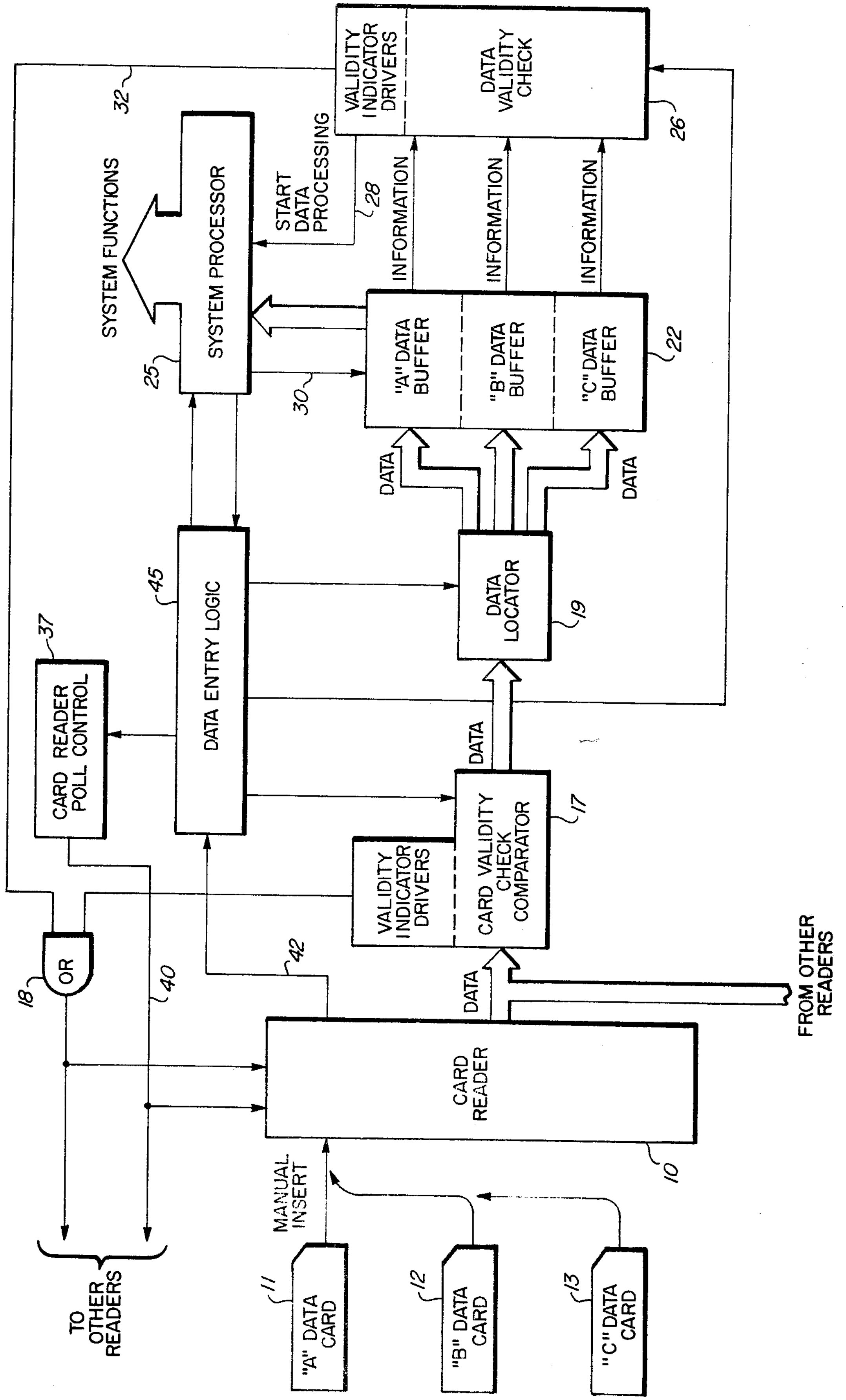
VALIDITY INDICATOR DRIVERS
DATA VALIDITY CHECK
26
32
SYSTEM FUNCTIONS
SYSTEM PROCESSOR
START DATA PROCESSING
28
INFORMATION
INFORMATION
INFORMATION
25
30
"A" DATA BUFFER
"B" DATA BUFFER
"C" DATA BUFFER
22
DATA
DATA
DATA LOCATOR
19
45
DATA ENTRY LOGIC
37
CARD READER POLL CONTROL
DATA
CARD VALIDITY CHECK COMPARATOR
17
VALIDITY INDICATOR DRIVERS
42
DATA
FROM OTHER READERS
18
OR
40
CARD READER
10
MANUAL INSERT
TO OTHER READERS
11
"A" DATA CARD
12
"B" DATA CARD
13
"C" DATA CARD

SEQUENTIAL CARD READER SYSTEM

RELATED PATENTS AND APPLICATIONS

The card and card reader security system disclosed in copending application Ser. No. 30,308 filed Mar. 16, 1979 is of a type which may be used in conjunction with the system of this application. In addition the system of this application also may be utilized in card actuated data systems of the type disclosed in U.S. Pat. Nos. 4,066,880 issued Jan. 3, 1978 and 4,085,313 issued Apr. 18, 1978. The present application and the above identified copending application and patents all are assigned to the same assignee.

BACKGROUND OF THE INVENTION

The two patents mentioned above both are of a type common to systems in a rapidly expanding field of applications employing "intelligent" data terminals. Many of these systems, such as those disclosed in the above patents, automatic unattended bank teller systems, and the like, operate in response to the insertion of encoded "credit" cards into a card reader of the system. Such systems usually are operated in response to the entry of an authorized credit document card having variable data encoded on it to identify the user, the types of products or extent of credit to which the user is entitled, and other information required by the particular system with which the card is used. When the card is inserted into the card reader input for the system, the fixed data encoded on the card is transferred by the system to verify the card, limit or specify the particular transaction to which the user of that card is entitled, and initiate data record keeping portions of the system. Usually the card user additionally enters variable data related to the specific transaction desired by means of a keyboard or other actuating device to cause the system to perform the desired operation.

As disclosed in the above mentioned copending application, the "credit" cards may include additional means for ensuring that only authorized cards are used with any particular system. Also as is evident by an examination of a typical card used in the system of the above-mentioned copending application, there is a finite or limited amount of data which can be encoded on the card. In many systems, the amount of fixed data required for the system transaction bookkeeping exceeds the capacity which can be conveniently encoded on a credit card of conventional size. The alternative is to use larger cards, but the public has become accustomed to handling all types of credit transactions with a standard sized, relatively stiff plastic credit card having dimensions approximately $2\times3\frac{3}{8}$ inches. Because of the widespread acceptance of credit cards of this size and type, it is desirable that credit card transactions carried out by unattended bulk terminal fuel dispensing systems, bank teller systems and other systems where products or business transactions are carried out in a completely unattended manner be effected by means of standard size credit cards.

It is desirable to provide an unattended document controlled utilization system which may have pre-encoded credit card document information supplied to it for use in a transaction which is in excess of the amount of information which conveniently can be encoded on a standard sized credit card.

SUMMARY OF THE INVENTION

Accordingly, it is an object of this invention to provide an improved document controlled utilization system.

It is an additional object of this invention to provide a document controlled utilization system using a card reader capable of accepting cards having a finite amount of data recorded on them where the data for operating the system exceeds the capacity of a single card.

It is a further object of this invention to provide a document controlled utilization system operating in response to information encoded on more than one document inserted sequentially into a single document reader for the system.

It is a further object of this invention to provide a document controlled utilization system operating in response to information encoded on more than one document which may be inserted sequentially in any order into the document reader for the system.

In accordance with the preferred embodiment of the invention, a document controlled utilization system is operated in response to documents inserted into a document reader, where each of the documents has a capacity of data which is less than the data required by the utilization system. A buffer storage memory is used to store data read by the document reader and this buffer storage memory has at least two storage areas corresponding to different locator data encoded on the documents used in the system. A data locator is connected to the document reader and the buffer storage memory and is responsive to the locator data read from the documents in the reader to cause the storage of the information data read from the documents in the area of the buffer storage memory which corresponds to the locator data encoded on the document. The data information stored in the buffer storage memory then is transferred to the utilization system in proper sequence to be used by the utilization system.

BRIEF DESCRIPTION OF THE DRAWING

The sole FIGURE of the drawing is a block diagram of a preferred embodiment of the invention.

DETAILED DESCRIPTION

Reference now should be made to the drawing which illustrates, in block diagram form, a preferred embodiment of the invention. In the drawing, a card reader 10 is used to initiate operation of the document controlled utilization system in response to the insertion into the reader of information data cards. Typically, these data cards are the standard $2\times3\frac{3}{8}$ plastic cards with data encoded on them in accordance with any of a number of different conventional techniques. The data may be encoded by punching holes through the card to permit reading of the card by a photoelectric or wire switch reader, or the data may be magnetically encoded on the cards for use with a magnetic reader. The particular manner of encoding is not important; but for the system shown in FIG. 1, the utilization system requires more data than normally can be conveniently encoded on a single data card for reading by a conventional card reader 10. The data cards are manually inserted into the reader, and three such data cards 11, 12, and 13 are indicated in the drawing.

For the purpose of explanation of the preferred embodiment of the invention, assume that the necessary data for a single transaction is encoded on three different data dards 11, 12, and 13, forming a single set. Each of these three cards of the set is uniquely encoded with a "locator" code to specifically identify the location of that card in the sequence of cards for the set. This locator code is included in addition to the other data normally encoded for the purpose of handling the desired transaction to be produced by the system with which the cards are used. Typically, a two-digit binary code is used; and the different locator codes are indicated in the drawing on the cards by identifying these cards by the letters A, B, and C, respectively, for the cards 11, 12, and 13.

Since the data cards 11, 12 and 13 are conventionally sized data cards encoded in a conventional manner for use with readily available card readers 10, no modification of the card reader 10 is necessary in order accept data from the data cards 11, 12 and 13. Whenever one of the cards is inserted in any order into the card reader 10, an initial card reader validity check comparator 17 functions to perform a validity check on the card. This validity check is for the purpose of determining whether the particular card is one which is valid for use with the system. The validity check comparator circuit 17 can be of a type as shown in the above mentioned U.S. Pat. No. 4,085,313 which is variably programmed to reject particular cards for situations where the credit of the card user has been revoked, the card has been stolen, or for any other reason. In any event the validity check made by the comparator 17 is made on at least part of the data read by the card reader 10; and a validity indication is applied from the output of the comparator 17 through an OR gate 18 to the card reader 10. If the card is invalid, the signal sent to the card reader 10 by way of the OR gate 18 is such as to cause a rejection of the card which has been inserted into the reader. Rejection commonly is in the form of simply ejecting the card and providing a "rejection" indication on the card reader console. In some cases, a rejected card is "captured" by the reader by pulling it into the reader and depositing it into a storage area. In most cases however the cards used with the system pass the validity check made by the comparator circuit 17 and operate normally in conjunction with the system as described subsequently.

The data supplied by the card reader 10 through the validity check comparator circuit 17 is applied in parallel to a data locator circuit 19. The data encoded on the cards 11, 12 or 13 inserted into the reader 10 is physically located so that the initial data read by the card reader 10 constitutes the "locator" codes encoded into the cards. This code determines the particular position of the card in the set of three cards. The data locator circuit 19 includes decoding circuitry for determining which position in the set the particular card being read occupies. Transmission gates within the data locator 19 then cause the remainder of the data located on the card to be transferred to one of three areas of a buffer storage memory 22 in accordance with the encoded "locator" code on the card. The three different paths for this data are shown at the output of the data locator connected to the three different areas A, B and C of the buffer memory 22.

Thus, if data card 12 (encoded with locator code "B") is inserted into the card reader, the data locator 19 directs the data being read from that card into the central or "B" data area of the data memory 22. Similarly, the data from card 11 (locator code "A") is transferred to the upper area of the memory 22, while the data encoded on card 13 (locator code "C") is transferred to the lowermost area of the memory 22, as shown in the drawing. It does not make any difference in what order the cards 11, 12 and 13 are inserted into the reader. The data locator 19 determines which card is being read and transfers the information data on that card to the appropriate section of the buffer memory 22. Thus, after all three cards have been inserted into the reader, all three areas of the buffer memory are full, and present the data in the proper order for subsequent utilization by the system processor 25.

Once all three areas of the buffer memory 22 have data stored in them, corresponding to a complete set of data encoded on the three data cards 11, 12 and 13, signals representative of that condition are applied to a data validity check circuit 26 which then applies a "start data processing" signal over an output lead 28 to the system processor 25. The system processor 25 in turn applies appropriate enabling signals to the memory 22 over a lead 30 to transfer the data temporarily stored in the buffer memory 22 to the system processor 25 over the data output leads shown interconnecting the buffer memory 22 and the system processor 25.

In the event that an attempt is made to reinsert one of the data cards 11, 12 and 13 which already has been inserted into the reader 10 out of the set, that area of the buffer memory 22 already has data stored in it. If such an attempt is made, this is detected by the output of the buffer memory 22 applied to the validity check circuit 26 which then supplies a signal over a lead 32 through the OR gate 18 to the card reader 10 to cause a rejection of the card and an error indication to be displayed on the panel of the card reader 10. The user of the system then has a fixed length of time in which to insert the remaining proper card or cards. If this is not done within such a time interval, the system is reset; and it is necessary to start all over again to initiate the transaction.

The system description which has been given above is one which is valid for any system in which only a single card reader 10 is used with a single system processor 25 and the associated circuitry described. In most systems, however, particularly those of the type shown in the above mentioned patents, several different card readers are used in conjunction with a single system processor for operating the utilization system. To permit operation in this manner, a card reader polling control circuit 37 is employed. The circuit 37 applies polling signals over a common output lead 40 to all of the card readers 10 in such a system to uniquely poll each of the different readers under control of encoded polling signals, each of which identifies a different one of the card readers 10 used in the system. Such polling systems are well known in the art; so that the details of the polling system itself are not considered necessary here.

A card reader 10 only responds to its polling signal if a data card 11, 12 or 13 already has been inserted into the reader at the time the polling signal arrives. If this happens, the reader applies a "reader engaged" signal over a lead 42 to a data entry logic circuit 45 to indicate that the reader has been engaged for use in the system. When this occurs, the data entry logic circuit 45 applies a signal to the card reader polling control circuit 37 to interrupt the polling sequence until completion of the system operation to transfer the data read from the cards by the reader 10 to and through the system processor 25.

The data entry control logic 45 then also supplies an enabling control signal to the card validity check comparator circuit 17 to permit it to operate in determining the validity of the the data card inserted into the reader 10. The circuit 17 operates in the manner described previously to perform this validity check. After the validity check has been effected, the data locator circuit 19 is enabled for operation by the data entry logic circuit 45 to perform its function as described above. Finally the data validity check circuit 26 is enabled for operation after the insertion of the thrid card of the set into the card reader 10 (as determined by the data entry logic 45 receiving signals from the card reader over the lead 42).

After the validity check is made by the circuit 26 as described previously the start data processing signal is applied from the circuit 26, over the lead 28 to the system processor 25. This transfers the data from the memory 22 as described previously. At the same time, the system processor 25 applies a signal to the data entry logic circuit 45 to reinitialize or reset that logic circuit for commencement of a new cycle of operation. As a result of this, the card reader polling control circuit 37 is permitted to continue its polling of other card readers in the system to establish a new sequence of operation for storing the data from a different set of three cards in the appropriate sections of the buffer storage memory 22 as described above.

If three cards are not inserted into the card reader within a predetermined period of time, as established by the resetting or setting of a time out circuit (not slower, but which may be of any conventional type) in the data entry logic circuit 45, the data validity check circuit 26 provides an output pulse placing the card reader 10 in the reject status or invalid data status and resetting the entire circuit. If a person using the reader 10 is provided with such an output indication from the card reader, it is necessary for the user then to reinitiate his insertion of the three data cards of the set into the reader 10 to use it to operate the system processor to effect the desired system operation for the system with which the reader 10 is associated. As far as the user is concerned, all of this can be accomplished on what appears to be a real time instantaneous basis, even though system polling is being effected by means of the polling control circuit 37. The time for reading the data from a card and for polling all of the different card readers 10 in the system is relatively short so that the user of any one of the readers 10 does not even need to be aware that there are other readers in the system sharing the common buffer memory 22 and a single system processor 25.

This card reader and the control logic shown in the drawing for transferring the data from the buffer memory 22 to the system processor may be substituted for the card readers of the above mentioned patents. The entry of variable data made in conjunction with the data supplied by the cards or documents read by the card reader then may be accomplished in the same manner as desribed in the disclosures of those patents. The system which is shown in the drawing and which has been described above, permits an extension of a standard card reader to supply fixed data messages in excess of the amount of data capable of being stored on any one document or credit card to be used with the system. The number of cards used theoretically is unlimited, although from a practical standpoint a relatively small number cards for any one transaction is preferable, simply because of the physical problems encountered with carrying several cards for use with each transaction of the system by any user.

The foregoing description of the preferred embodiment as shown in the drawing should be considered illustrative only of the invention and is not to be considered as limiting. Various changes and modifications will occur to those skilled in the art for implementing the inventive concepts without departing from the scope of the invention.

I claim:

1. A document controlled utilization system responsive to transaction data encoded on two or more documents of a set of documents for use therewith, each document of the set having a portion of the information data for the transaction encoded thereon and having unique locator data identifying the position of the document in the set also encoded thereon, the system including in combination:

document reading means for reading data from documents of a set sequentially inserted therein in any order, each of such documents having a capacity of data which is less than the total amount of the transaction data required by the utilization system;

buffer storage means for storing data read by said reading means and having storage areas equal in number to the number of documents of a set of documents, each of said storage areas being identified by and corresponding to the unique locator data of the document of a set to which said storage area corresponds;

data locator means connected with said reading means and said buffer storage means and responsive to locator data read from documents by said reading means for causing storage of information data read from a document in the one of said storage areas of said buffer storage means corresponding to the unique locator data encoded on such document irrespective of the sequential order in which the documents of a set are inserted into said reading means; and means for coupling said buffer storage means with the utilization system for transferring information from said buffer storage means to the utilization system.

2. The combination according to claim 1 further including circuit means coupled with said buffer storage means for initiating the transfer of information data from said buffer storage means through said coupling means to said utilization system upon completion of storage of information data in each of said storage areas of said buffer storage means.

3. The combination according to claim 2 wherein said circuit means further is coupled with said document reading means for producing an indicia thereat of the validity/invalidity of data stored in said buffer memory means.

4. The combination according to claim 1 further including validity check means coupled with said document reading means for verifying and validity of documents inserted therein for providing indicia at said document reading means of the validity/invalidity of a document inserted therein.

* * * * *